F. C. HOFFER & J. A. SAIKOW.
STAND AND CARRIER FOR MOTOR CYCLES AND BICYCLES.
APPLICATION FILED NOV. 25, 1907.
907,358.
Patented Dec. 22, 1908.
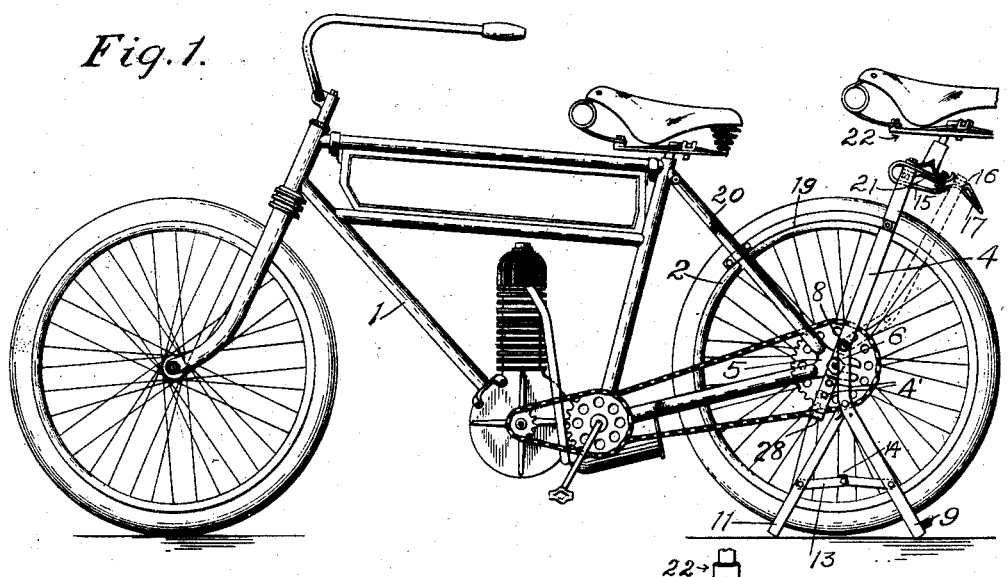
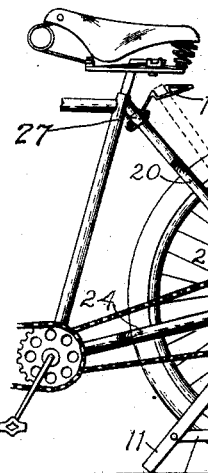
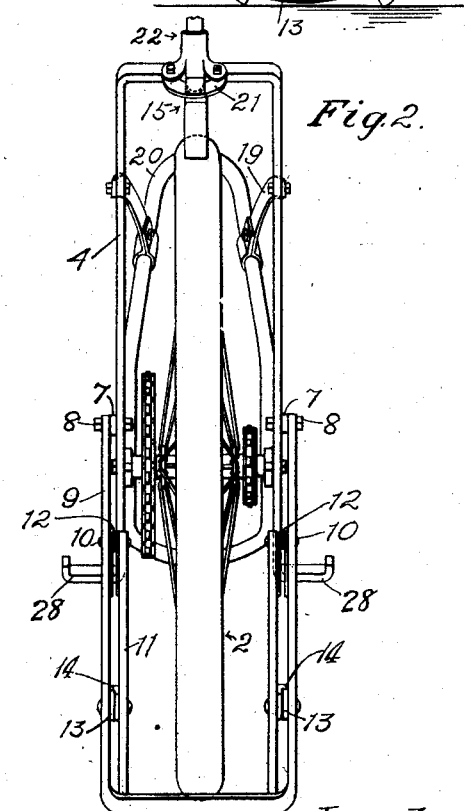
Witnesses:—
Louis W. Gratz.
Frank L. Graham.
Inventors
Fred C. Hoffer
Jacob A. Saikow

UNITED STATES PATENT OFFICE.

FRED C. HOFFER, OF LOS ANGELES, AND JACOB A. SAIKOW, OF SANTA MONICA, CALIFORNIA, ASSIGNORS, BY DIRECT AND MESNE ASSIGNMENTS, TO EXCELSIOR SUPPLY COMPANY, OF CHICAGO, ILLINOIS, A CORPORATION.

STAND AND CARRIER FOR MOTOR-CYCLES AND BICYCLES.

No. 907,358.   Specification of Letters Patent.   Patented Dec. 22, 1908.

Application filed November 25, 1907.   Serial No. 403,818.

*To all whom it may concern:*

Be it known that we, FRED C. HOFFER, a subject of the Emperor of Austria-Hungary, residing at Los Angeles, county of Los Angeles, State of California, and JACOB A. SAIKOW, a subject of the Emperor of Russia, and residing at Santa Monica, Los Angeles county, State of California, have invented a new and useful Stand and Carrier for Motor-Cycles and Bicycles, of which the following is a specification.

This invention relates to means for supporting bicycles and motor cycles, when not in use, and an object of the invention is to provide means for this purpose which is carried by the machine and can be readily moved into operative position to support the machine, or moved to and held in inoperative position, where it will not interfere with the use of the machine.

Another object of the invention is to provide a stand which will hold the driving wheel clear of the ground enabling free movement of said wheel. This feature of the invention is particularly of value in connection with motor cycles, as it enables the engine to be tested, or started up when it fails to start in the usual manner.

Another object of the invention is to provide a carrier for use in connection with the stand, for attachment of supplemental means, such as a rear seat, or a package carrier.

In the accompanying drawings:—Figure 1 is a side elevation of a motor cycle provided with our invention, including the supplemental carrier. Fig. 2 is a rear view of the machine, with the invention attached as in Fig. 1. Fig. 3 is a side view of the rear portion of the machine, without the supplemental carrier.

1 designates the frame of the bicycle or motor cycle, and 2 the rear or driving wheel thereof.

Referring first to Figs. 1 and 2, the stand is attached to the two rear frames by a bail shaped bar 4, attached to the rear axle hanger 5 at each side of the machine, and extending up over the rear wheel, and fastened by nut 6. To a stud 7 on this bar is pivoted at 8 a bail 9 forming one leg of the stand, and to this bail is pivoted at 10 another bail 11, forming another leg of the stand. A spring 12 is coiled around the pivot 10 of these legs, and its ends attached to the respective legs so as to tend to spread the legs to position shown in Fig. 1, the legs being held from spreading further by toggle links 13 connecting them, one of said links having a flange 14 extending over the other link to prevent the toggle passing the dead center. In this position of the parts the lower ends of legs 9, 11, extend below the bottom of the tire of wheel 2, so that as these legs rest on the ground, the said wheel is raised from the ground.

Means are provided for holding the stand in inoperative position, said means consisting of a spring catch 15, attached to supporting member 4, said catch being bent to form a leg receiving notch 16, and, beyond said notch, an incline portion 17.

When the machine is in use the parts are in the position shown in dotted lines in Fig. 1, the two legs of the stand being seated in the notch 16 of the spring catch. In this position the springs 12 cause the leg 9 to bear on one wall of notch 16 and the leg 11 to bear on the other wall of said notch, so that the parts are held from rattling. When the rider dismounts he may bring the stand into use by depressing the spring catch 15, to release the legs 9, 11 therefrom, and then turning the legs down to rest on the ground, said legs being spread apart by the action of springs 12, and the machine being lifted slightly to allow the stand to fall to position shown in full lines, when said stand will support the machine with the rear wheel off the ground. This manner of supporting the wheel is of especial advantage with a motor cycle. In some cases it has been necessary for the rider to push the machine rapidly for a considerable distance, and possibly to repeat the operation, with adjustment of the carbureter, sparker, etc., before the engine will start. But with this device, the stand can be lowered to the ground and the rear wheel supported free of the ground, by a single movement of the arm, and the engine can then be "turned over" as many times as desired, and the parts brought to right adjustment, with a minimum of trouble. When the rider wishes to mount he pushes the machine forward from the position of Fig. 1, the machine riding over on the forward leg of the stand, so as to bring the rear wheel to the ground, the stand turning to the back of the wheel and being then lifted, its two members 9, 11 being folded together and then caught in spring catch 16, as shown in dotted lines. The catch 16 is deep enough to receive the ends of both legs, the longer leg engaging with the forward shoulder and permitting the shorter leg to be folded up even therewith when said shorter leg is pushed forward to pass over and be engaged by the rear shoulder. The stand attaching member 4 is preferably braced by a bar 19 connecting the same with rear fork 20 of the machine. This attaching means may also be utilized as a means for support of other supplemental devices, for example a rear seat 22 attached to a bracket 21 at top of member 4. The sides of the U-shaped member or bail 4 are each provided at its lower portion with perforations 4', by means of which the bail can be adjustably secured to the machine. The lower ends of the sides of the bail are also preferably bent laterally, as shown at 28, to form stirrups or foot supports for the rider on the seat 22, and also to form a stop to prevent the excessive movement of the bent portion of the bail 9, in case it should swing too far forward, as by the backward movement of the machine. In case such supplemental attachments are not desired, the attaching means may consist of strap means 23, Fig. 3, bent around and clamped on the rear fork members 20, 24, of the machine by bolts 25. In this construction the catch 15' is secured to the rear fork 20 by means of an ordinary clamp 27 so as to project to the rear in the same manner as does the catch 15 of the other construction.

What we claim is:—

1. A stand for bicycles comprising a U-shaped bail having the lower portions of its legs perforated and adapted to be thereby secured to the rear fork of a bicycle, the free end of each leg being bent outwardly, a bail like support pivotally secured at its free ends to said legs above the point of attachment with said fork, the bend of the support being adapted to rest upon the ground and support the rear wheel above the ground, the sides of the support being adapted to engage with said outwardly bent ends and be thereby prevented from excessive forward movement, and a catch near the upper end of the inverted bail for holding the support elevated, the upper end of said bail being provided with a seat.

2. A stand for bicycles comprising a member adapted to be secured to each side of the rear fork of a machine, a substantially U-shaped leg pivotally secured at each end thereto, a similar leg pivotally secured at its ends to the sides of the other leg, a spring around each last mentioned pivot, an upwardly folding connector secured at its ends to the corresponding sides of said legs and provided at its pivot with a stop for preventing it from passing the dead center, and a catch provided with two shoulders for engaging with said legs and holding them in the same plane when they are in an inoperative position.

3. A stand for bicycles comprising a bail like member adapted to be secured at its ends to the sides of the rear fork of a machine and extending up over the rear wheel, a substantially U-shaped leg pivotally secured at its ends to the sides of said bail, a similar leg pivotally secured at its ends to the sides of said leg, means for normally holding the free ends of said legs at a predetermined distance apart, and a spring catch secured to the upper portion of the bail in position for engaging with said legs and holding them locked in substantially the same plane when they are raised into inoperative position.

4. A stand for bicycles comprising a bail like member having its ends bent laterally to form stirrups and perforated adjacent thereto for being adjustably secured to the sides of the rear fork of a machine, a seat and a catch secured to the upper portion of the bail, and a spring pressed, U-shaped leg pivotally secured at its ends to the first mentioned leg above the point of attachment to said fork, the free ends of said legs being adapted to hold the wheel above the ground when in their operative position and to be engaged by said catch and fold upward in substantially the same plane when in their inoperative position.

In testimony whereof, we have hereunto set our hands at Los Angeles, California, this 15th day of November 1907.

FRED C. HOFFER.
JACOB A. SAIKOW.

In presence of—
ARTHUR P. KNIGHT,
FRANK L. A. GRAHAM.